(12) United States Patent
Lepschi et al.

(10) Patent No.: US 8,899,628 B2
(45) Date of Patent: Dec. 2, 2014

(54) COUPLING FOR A PLUG-IN CONNECTION

(71) Applicant: Bayerische Motoren Werke Aktiengesellschaft, Munich (DE)

(72) Inventors: Matthias Lepschi, Munich (DE); Norbert Dembinski, Munich (DE); Wolfram Enke, Munich (DE); Florian Iser, Munich (DE); Thomas Spiess, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/011,076

(22) Filed: Aug. 27, 2013

(65) Prior Publication Data

US 2013/0341910 A1  Dec. 26, 2013

Related U.S. Application Data

(63) Continuation of application No. PCT/EP2012/000461, filed on Feb. 2, 2012.

(30) Foreign Application Priority Data

Feb. 28, 2011 (DE) .......................... 10 2011 004 859

(51) Int. Cl.
*F16L 41/00* (2006.01)
*F16L 55/07* (2006.01)
*F02M 35/10* (2006.01)

(52) U.S. Cl.
CPC .......... *F16L 55/07* (2013.01); *F02M 35/10321* (2013.01); *F02M 35/10354* (2013.01)

USPC .......... 285/14; 285/13; 285/129.1; 285/129.2

(58) Field of Classification Search
USPC ................. 285/14, 13, 129.1, 129.2
See application file for complete search history.

(56) References Cited

U.S. PATENT DOCUMENTS

| 783,586 | A | * | 2/1905 | Luff ........................... 285/129.2 |
| 924,839 | A | * | 6/1909 | Schmidt ..................... 285/129.2 |
| 954,604 | A | * | 4/1910 | Young ........................ 285/129.2 |
| 1,071,306 | A | * | 8/1913 | Finigan ...................... 285/129.1 |
| 1,111,816 | A | * | 9/1914 | Willing .......................... 285/13 |
| 1,624,653 | A | * | 4/1927 | Boosey ...................... 285/129.2 |

(Continued)

FOREIGN PATENT DOCUMENTS

| EP | 0 237 508 A1 | 9/1987 |
| EP | 2 363 628 A2 | 9/2011 |
| FR | 2 353 324 A1 | 12/1977 |

OTHER PUBLICATIONS

German-language Written Opinion (PCT/ISA/237) dated Sep. 27, 2012 (Six (6) pages).

(Continued)

*Primary Examiner* — David E Bochna
(74) *Attorney, Agent, or Firm* — Crowell & Moring LLP

(57) ABSTRACT

A coupling component is provided for a plug-in connection for media-carrying lines, and includes a flow channel that has an inner cross-section that is enlarged in steps in order to allow the formation of a reflux zone when carrying the media, and a vent opening. The step-like enlargement is asymmetrically formed over the circumference of the inner cross-section so as to achieve an improved separation capacity.

11 Claims, 2 Drawing Sheets

(56) References Cited

U.S. PATENT DOCUMENTS

| | | | | |
|---|---|---|---|---|
| 2,471,708 | A * | 5/1949 | White | 285/13 |
| 4,039,213 | A * | 8/1977 | Walters | 285/13 |
| 5,259,185 | A * | 11/1993 | Peterson | 285/14 |
| 8,177,261 | B2 * | 5/2012 | Guerineau | 285/13 |
| 2005/0104373 | A1 | 5/2005 | Zarubaiko | |
| 2011/0215565 | A1 | 9/2011 | Bauer et al. | |

OTHER PUBLICATIONS

International Search Report dated Sep. 27, 2012 with partial English translation (Seven (7) pages).

* cited by examiner

COUPLING FOR A PLUG-IN CONNECTION

CROSS REFERENCE TO RELATED APPLICATIONS

This application is a continuation of PCT International Application No. PCT/EP2012/000461, filed Feb. 2, 2012, which claims priority under 35 U.S.C. §119 from German Patent Application No. DE 10 2011 004 859.6, filed Feb. 28, 2011, the entire disclosures of which are expressly incorporated by reference herein.

BACKGROUND AND SUMMARY OF THE INVENTION

The invention relates to a coupling for a plug-in connection for media-carrying lines, having a flow channel that has an inner cross-section that is enlarged in steps in order to permit the formation of a reflux zone when carrying the media, and a vent opening.

Plug-in connections are known for connecting media-carrying lines, for example, in the cooling-water and heating lines field, as well as for the use in charge-air systems in motor vehicles. Such plug-in connections comprise a normally standardized connection piece and a coupling with a retaining spring, a retaining ring and a sealing device, which can be connected with the connection piece in a tool-free manner for closing the plug-in connection. A junction, a retaining plate, a receiving device for thermosensors or a separating outlet for gas, for example, are already being integrated in the coupling.

However, known couplings with a separating outlet always have an insufficient separating effect, so that a cooling capacity is reduced, for example, when used in a coolant line.

It is therefore an object of the invention to provide a coupling of the above-mentioned type by which an improved separating performance can be achieved.

This and other objects are achieved by providing a coupling having the characteristic that the step-type expansion is asymmetrically formed over the circumference of the inner cross-section. Therefore, when the media are carried, the formation of a reflux zone can be achieved that is asymmetrical over the circumference of the inner cross-section.

The step-type expansion preferably has an area of minimal expansion and an area of maximal expansion. It is very useful to form no step or only a slight step in the area of minimal expansion. In the area of maximal expansion, the coupling may have a step whose height amounts to approximately 10-60%, particularly approximately 20-50% of the nominal width of the coupling. The nominal width may be the clear width of a line-side end of the coupling or of a connection piece that can be connected with the coupling. Thus, in the area of minimal expansion, a low-loss carrying of the media can take place, and, in the area of maximal expansion, a particularly large and/or dynamic reflux zone can form.

In a preferred embodiment, the vent opening is therefore arranged in the area of maximal expansion. A particularly effective venting can therefore take place.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
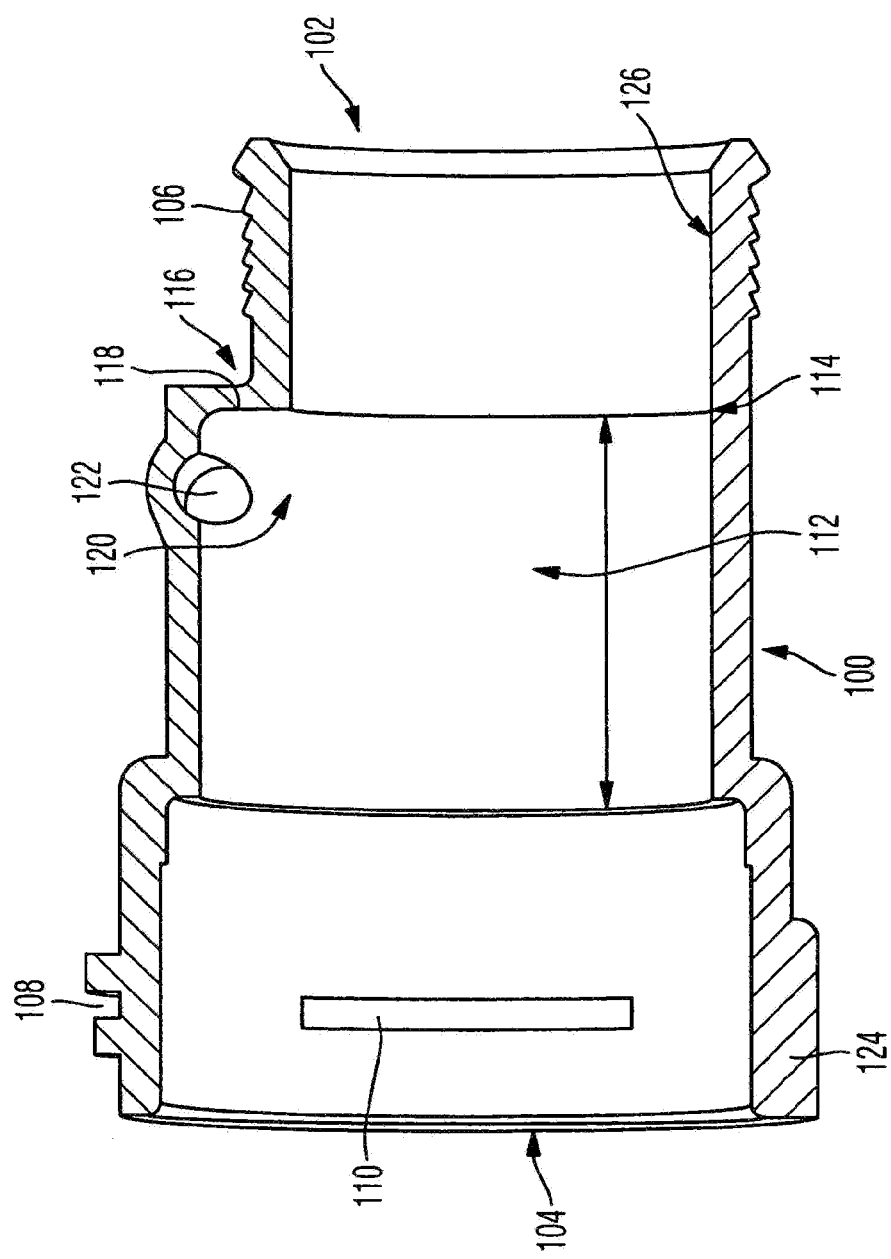
FIG. 1 is a schematic sectional view of an example of a coupling with an enlarged reflux zone and an integrated vent opening.

FIG. 1 illustrates a coupling 100 of a plug-in connection for media-carrying lines that is otherwise not shown in detail. The coupling 100 is intended and suitable for the connection with a corresponding connection piece. The line may be a hose or a pipe, such as a smooth piping or a corrugated piping. A liquid, such as a heat transfer liquid, a lubricating liquid, water, oil, fuel or a brake fluid can be carried in the line. The coupling 100 can be used in a motor vehicle, particularly in an internal-combustion-engine-driven passenger car or in a motorcycle.

The coupling 100 can be made of a material, for example, a plastic material, that can be recycled. The coupling 100 may, for example, be made of polyamide, if required, mixed with fiberglass. The coupling 100 may be made of polyamide 6.6 with a fiberglass content of approximately 30%. However, the coupling 100 may also be made of a different technical thermoplastic with a different filling ratio and/or a different filler. The coupling 100 is preferably suitable for a use at temperatures of from −40° C. to +135° C.

The coupling 100 has a line-side end 102 and a connection-piece-side end 104. The line-side end 102 comprises a contracted outer surface 106 for the connection with and fastening of a line. The connection-piece-side end 104 comprises an outer-side receiving contour 108 for a retaining spring, as well as openings 110 for the retaining spring, so that, by means of the retaining spring, a releasable form fit can be elastically established with a connection piece that can be received on the inner side of the coupling 100. In addition, a sealing ring and/or a retaining ring may be integrated in the coupling 100. The sealing ring may be an O-ring, for example, made of EPDM.

The coupling 100 has a center area 112 between the line-side end 102 and the connection-piece-side end 104. The inside diameter of the center area 112 is greater than the inside diameter of the line-side end 102. The inside diameter of the connection-piece-side end 104 is greater than the inside diameter of the center area 112. If required, the center area 112 may also have a longer construction.

The enlargement of the diameter from the center area 112 to the line-side end 104 takes place in steps but is asymmetrical over the circumference. In the sectional view of FIG. 1, a minimal enlargement of the diameter is provided at the lower inside diameter 114 and a maximal enlargement of the diameter is provided at the upper inside diameter 116. As a result, a pronounced edge 118 exists at the upper inside diameter 116, which edge 118 permits the formation of a particularly large and/or dynamic reflux zone 120.

A vent opening 122 is arranged in the area of this reflux zone 120. When a liquid medium, such as cooling water or oil, which is loaded with air, flows in the line and through the coupling 100, a reflux zone 120 may form behind the edge 118, in which reflux zone 120 air may collect. The collected air can be discharged through the vent opening 122.

The coupling body 124 can be produced by injection molding in a multipart tool, a first slide being provided for the shaping of an inner contour 126 forming the flow channel, and a second slide being provided for producing the vent opening 122.

Figure 2:
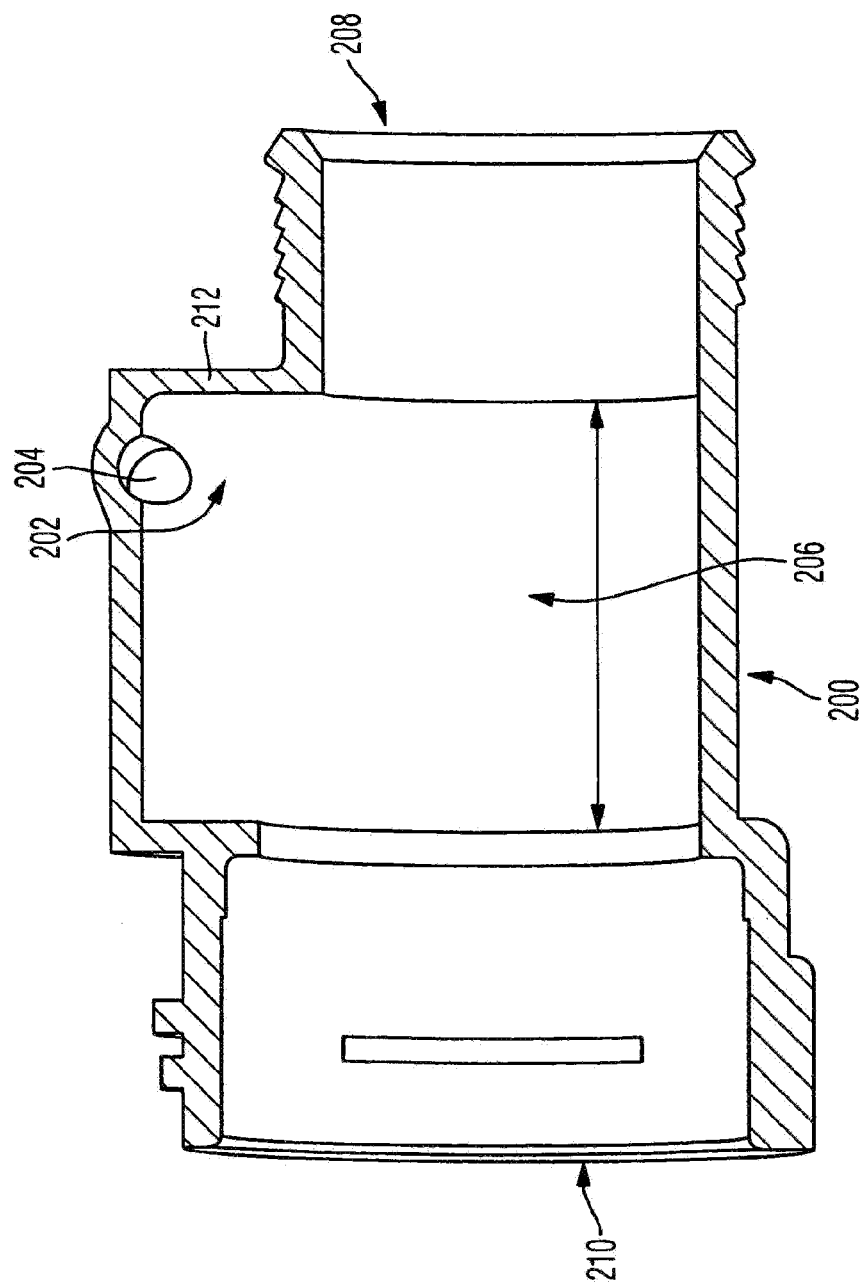
FIG. 2 is a schematic sectional view of an example of a coupling with an enlarged reflux zone and an integrated vent opening.

FIG. 2 is a sectional view of a coupling 200 with an enlarged reflux zone 202 and an integrated vent opening 204, in which the center area 206 has a particularly large inside diameter. In this embodiment, the inside diameter of the center area 206 is not only greater than the inside diameter of the line-side end 208 but also greater than the inside diameter of the connection-piece-side end 210. This provides an especially pronounced edge 212, and the efficiency of the separation can be further improved. In addition, reference is made to the description of the coupling 100 according to FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component of a plug-in connection for media-carrying lines, comprising:
   a coupling have a flow channel through the coupling, an inner cross-section of the flow channel being enlarged in steps in order to form a reflux zone when carrying the media, wherein
      a line-side end of the flow channel includes a passage for media flow to or from a first one of the media-carrying lines and a contracted outer surface for connection with and fastening to the first one of the media-carrying lines,
      a connection-piece end of the flow channel includes a passage for media flow to or from a mating connection-piece of a second one of the media-carrying lines, the media passage of the connection-piece end having a central axis that is parallel to a central axis of the media passage of the line-side end, and the connection-piece end having an outer-side receiving contour configured to receive a media-carrying line retaining spring and having a smooth inside surface configured to receive a sealing ring for sealing an annular space between the smooth inside surface and the mating connection-piece of the second one of media-carrying lines,
      the reflux zone is located between the line-side end and the connecting-piece end,
      the media flow passages of the line-side end and the connecting-piece end have smaller cross-sectional areas than a cross-sectional area of the reflux zone,
      the cross-sectional area of the media flow passage of the line-side end is smaller than the cross-sectional area of the media flow passage of the connection-piece end,
      the reflux zone is asymmetrically formed over a circumference of the inner cross-section of the flow channel such that a central axis of the reflux zone is not co-axial with the central axis of the media passage of the line-side end,
      at least one vent opening to a region outside the media-carrying lines is formed in at least one of the reflux zone and steps between the reflux zone and each of the line-side end media passage and the connection-piece end media passage, and
      the coupling includes an inner surface in the flow channel that is continuous between the reflux zone and each of the line-side end media passage and the connection-piece end media passage except for the at least one vent.

2. The component according to claim 1, wherein the flow channel has an area of minimal enlargement and an area of maximal enlargement.

3. The component according to claim 2, wherein, in the area of minimal enlargement, only a slight step or no step is formed.

4. The component according to claim 3, wherein, in the area of maximal enlargement, a step enlargement has a height of approximately 10-60% of a nominal width of the coupling.

5. The component according to claim 3, wherein, in the area of maximal enlargement, a step enlargement has a height of approximately 20-50% of a nominal width of the coupling.

6. The component according to claim 5, wherein the vent opening is arranged in the area of maximal enlargement.

7. The component according to claim 3, wherein the vent opening is arranged in the area of maximal enlargement.

8. The component according to claim 2, wherein, in the area of maximal enlargement, a step enlargement has a height of approximately 10-60% of a nominal width of the coupling.

9. The component according to claim 8, wherein the vent opening is arranged in the area of maximal enlargement.

10. The component according to claim 2, wherein, in the area of maximal enlargement, a step enlargement has a height of approximately 20-50% of a nominal width of the coupling.

11. The component according to claim 2, wherein the vent opening is arranged in the area of maximal enlargement.

* * * * *